Aug. 4, 1931.   A. R. JAYNE   1,816,853
WOOD PATCH MAKING MACHINE
Filed July 23, 1930   2 Sheets-Sheet 1
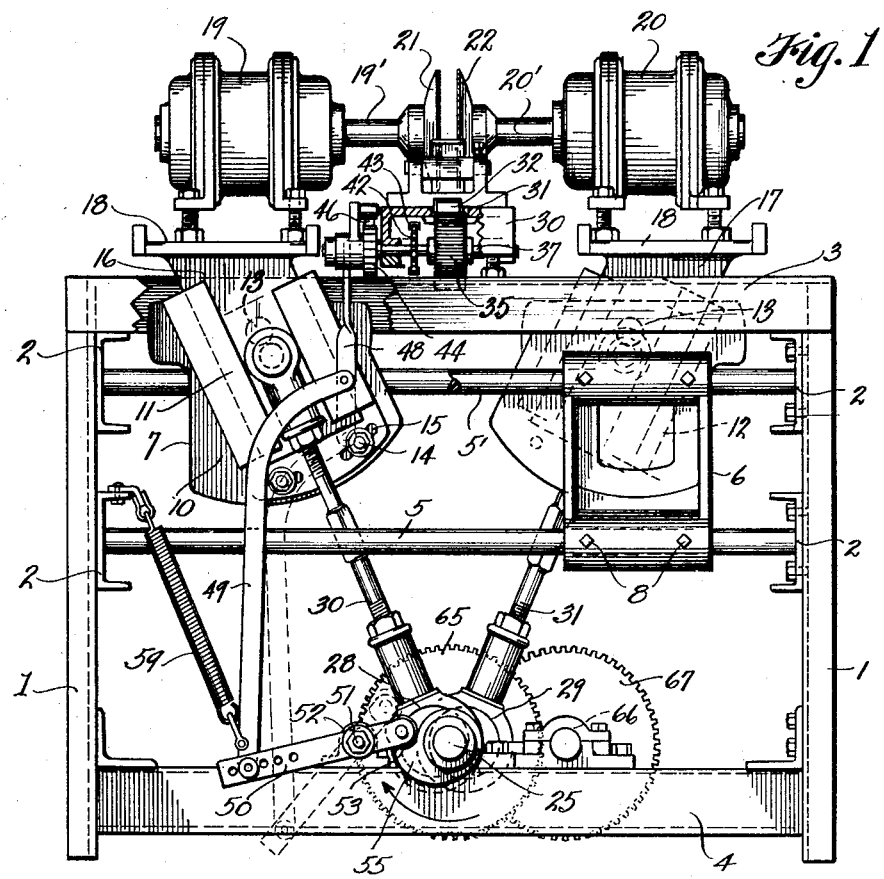

Aug. 4, 1931.   A. R. JAYNE   1,816,853
WOOD PATCH MAKING MACHINE
Filed July 23, 1930   2 Sheets-Sheet 2
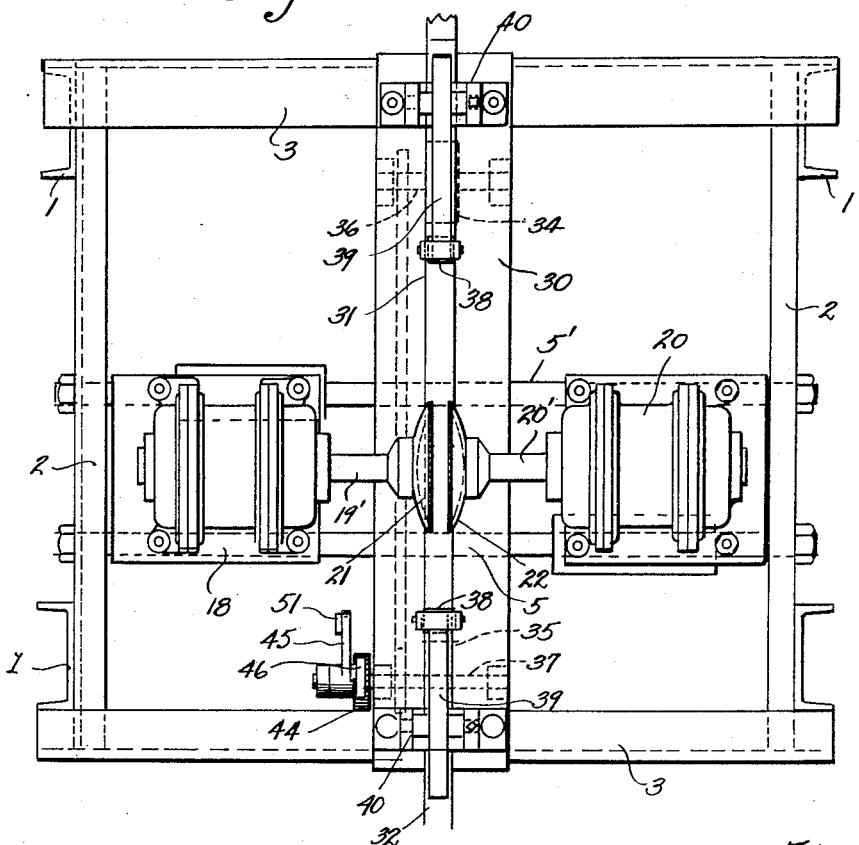
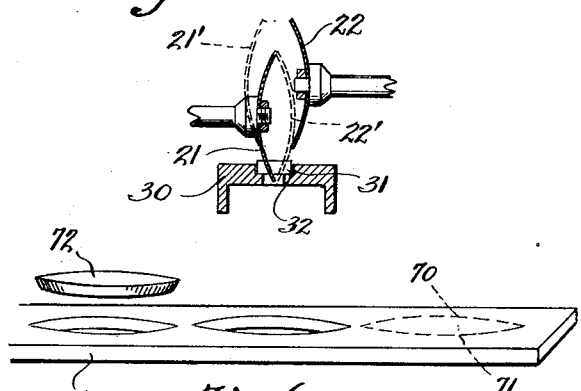
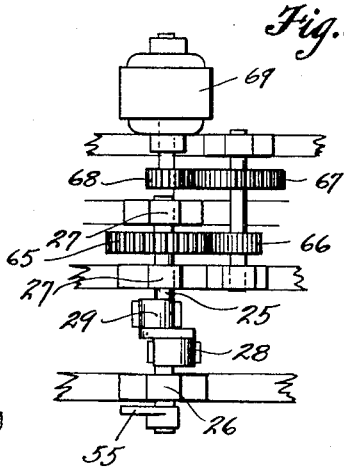

Patented Aug. 4, 1931

1,816,853

UNITED STATES PATENT OFFICE

AMES R. JAYNE, OF TACOMA, WASHINGTON, ASSIGNOR TO GLOBE MACHINE MANUFACTURING COMPANY, A CORPORATION OF WASHINGTON

WOOD PATCH MAKING MACHINE

Application filed July 23, 1930. Serial No. 470,120.

This invention relates to patch making machines, and it has reference in particular to a machine that operates to cut from strips of wood, or the like, patches or plugs for use in patching over pitch pockets, or other surface imperfections found in lumber so as to make the lumber suitable for use in the manufacture of furniture.

Explanatory to the invention, it will be stated that a considerable amount of lumber is suitable for the manufacture of furniture, especially veneered furniture, except for slight surface imperfections, such as are caused by cracks, pitch pockets, or the like, which can be corrected. Heretofore, it has been common practise to cut out the imperfection and to fill in with a wooden plug or patch, and ordinarily these plugs or patches were made by hand with special forms of chisels designed for this particular purpose. This, however, is a very slow process, and plugs or patches cannot be made accurately without very careful and painstaking work. Moreover, it is an expensive method when carried out by hand and ordinarily the saving does not warrant the costs.

In view of the above, it has been the object of the present invention to provide a machine whereby wooden patches of a desired shape may be made quickly and accurately; a machine which is relatively inexpensive, and which is automatic in so far as it concerns the feeding into the machine of the piece from which the patches are to be made and the shaping and cutting out of the patches.

It is also an object of the invention to provide for adjustments whereby the size and shape of the patches may be varied within certain limits.

More specifically stated, the present invention resides in the provision of a machine for cutting out wooden patches of oblong shape by use of two motor driven, cupped, circular saws placed in axial alinement and facing each other in spaced relation, and which may be moved downwardly against the piece from which the patches are to be cut so that each saw will operate to form a cut of arcuate form, and the two cuts thus made will intersect to define an elongated patch, tapering to points at its ends and with its side edges bevelled inwardly.

Other objects of the invention reside in the detail of construction of the saw mounting means and the means whereby the saws are reciprocally moved to cause them to alternately engage with and cut the strip to detach the patches.

Still further objects of the invention reside in the means for intermittently advancing the strip from which the patches are cut in accordance with the action of the saws.

Other objects of the invention reside in the various details of construction, and in the combination of parts, and in their mode of operation, as will hereinafter be described.

In accomplishing these and other objects of the invention, I have provided the improved details of construction, the preferred forms of which are illustrated in the accompanying drawings, wherein—

Fig. 1 is an elevation of a patch cutting machine constructed in accordance with the present invention, a part of the side frame being broken away for better illustrating the motor mounting slide.

Fig. 2 is a sectional view, particularly illustrating the feed mechanism for advancing the wooden strips to the saws.

Fig. 3 is a top, or plan view of the machine.

Fig. 4 is a sectional detail, illustrating the reciprocal action of the two saws.

Fig. 5 is a plan view of the driving means for actuating the motors reciprocally and for advancing the strip.

Fig. 6 is a perspective view of a part of a wooden strip from which patches have been cut.

Referring more in detail to the drawings—

The frame structure of the machine comprises opposite end frames, comprising legs 1 and horizontal cross beams 2 connecting the legs. These end frames are joined by upper and lower horizontal beams 3 and 4, respectively, and by two sets of parallel cross shafts 5—5' which are fixed at their ends in the cross beams 2 of the end frames.

Mounted slidably on the two sets of cross shafts, respectively, are blocks 6 and 7, which are adjustable along the shafts from and toward the longitudinal center of the machine and they may be held at any set position of adjustment by means of set screws 8 mounted therein and adapted to be tightened against the shafts. Each block has a flat, vertical inner surface, as designated at 10 in Figure 1, and disposed flatly against these vertical surfaces, are guides 11 and 12, each of which is mounted on its block by a pivot bolt or stud 13, which is fixed therein. These guides may be held at different positions of angular adjustment by bolts 14, which extend through arcuate slots 15 formed in the lower ends of the guides, as in Figure 1, and which are threaded into the blocks to be tightened against the guides.

Mounted in the two guides are slides 16 and 17, each of which comprises a shank portion that is reciprocally mounted in the guide and which at its upper end is formed with a horizontal platform 18. Electrically operated motors 19 and 20 are mounted securely upon the platforms 18 in axial alinement, and fixed on the adjacent ends of the motor shafts 19' and 20' are circular saws 21 and 22. These saws are of like diameter and are cupped or dished with their concave surfaces facing each other, as in Figure 4.

A main driving shaft 25 is mounted in bearings 26 and 27 on the cross beams 4 at the base of the frame structure and this shaft is equipped with two eccentrics or crank portions 28 and 29 on which ends of connecting rods 30 and 31 are mounted; these rods being pivotally connected at their upper ends, respectively, to the slides 16 and 17 so that rotation of the shaft 25 will effect reciprocal action of the slides in their guides. It is to be pointed out also that the guides 11 and 12 are set in such angular relation on the blocks and to each other that, as the slides move upwardly therein, the motors will be moved upwardly and outwardly with respect to the longitudinal center of the machine; then as they move downwardly, the motors will move downwardly and inwardly. This action is indicated best in Figure 4 wherein the saw 21 is shown in its lowered position and saw 22 in its raised position. In dotted lines at 21' and 22', the two saws are shown in their opposite positions.

Mounted centrally across the top of the frame, between the motors and at a right angle with respect to the axial direction of the motors, is a beam 30, having a guide groove 31 in its top surface along which the strip of wood, or the like, 32, from which patches are to be cut, may be advanced. The wooden strip is automatically advanced by an intermittently operating feed mechanism comprising a pair of knurled rollers 34 and 35 mounted by shafts 36 and 37, respectively, with their top edges extended into the base of the guide groove 31 so that the strip 32 rests thereon. The strip is urged down against the rollers by a pair of spring pressed rollers 38 carried at the ends of leaf springs 39 adjustably mounted by brackets 40 fixed on top of the cross beam, as in Figure 2. The shafts 36 and 37 are provided, respectively, with sprocket wheels 41 and 42 and a chain belt 43 extends about these sprockets so that they will rotate in unison. At one end of the shaft 37, a ratchet wheel 44 is fixed, and adjacent this, a lever 45 pivotally mounted on the shaft which carries a spring pressed pawl 46 for engaging the ratchet. Links 48 and 49 connect the end of lever 45 with a pivotally mounted rocker lever 50 carried by a pivot 51 fixed in a bearing 52 on a cross beam 4 of the frame, and provided at one end with a roller 53 engageable with a cam 55 fixed on the driven shaft 25. A coiled spring 59 is attached to the frame and to the lever 45 to move it upwardly to maintain the roller 53 against the cam 55. The construction is such that when the shaft 25 is revolubly driven, the rise of cam 55 engages the roller 53 of the lever 50 to cause the outer end of the latter to actuate the ratchet mechanism and the latter to intermittently advance the strip 32. This advance movement may be made more or less as is desired by adjusting the connection of lever 45 with lever 50 closer to or away from the pivot 51.

The particular mechanism for driving the main shaft is immaterial, but in the present instance, I have illustrated it in Figure 5, preferably as being equipped with a driving gear 65 and this is connected through a train of reduction gearing 66, 67, and 68 with the shaft of an electric motor 69. The gearing would be designed to drive the shaft at the desired, or a suitable speed.

Assuming the parts to be so constructed and assembled, operation of the machine would be as follows: First, the motors for driving the two disc saws would be started; then a strip of wood 32 from which the patches are to be cut, would be applied within the groove 31 of the cross beams 30 so that it would be in proper position to be automatically advanced by the feed mechanism; then the motor 69 will be started to drive the main shaft 25 of the machine and, incident to rotation of the shaft 25, the slides 16 and 17 would be reciprocated in their guides in directions opposite to each other, so that the motors mounted thereby and the two saws would be actuated accordingly. This upward and downward travel of the saws, while they are revolving, causes first one and then the other to engage and cut through the strip 32 and the relationship of the saws is such that the arcuate cuts made thereby, as designated by dotted lines at 70 and 71 in Figure 6, will intersect and will define a patch of oblong shape, as shown at 72 in Figure 6. While the two saws are in neutral position, and both raised from the strip 32, it is advanced a definite distance as provided for by the feed mechanism actuated by the cam 55, so that the patches will closely follow each other along the strip.

If it should be desired to shorten or elongate the patch, this is done by spacing the saws farther apart, by adjustment of the motors outwardly, or otherwise. If it is desired to change the slope of the sides of the patches, this may be done by angular adjustment of the guides in their supporting blocks. This adjustment can also be used to lengthen or shorten the patch. Raising and lowering the motors and their platforms by adjustment of the connecting rods 30 and 31 also has the effect of increasing and decreasing the length of the patches and for this purpose the connecting rods are provided with right and left hand opposite end threads whereby they are attached to the end members.

The machine, so constructed and operated, will automatically cut out patches at a very rapid rate and the patches will be uniform and accurate in size.

One of the important features of the present invention resides in the fact that the cupped condition of the saws, and the manner in which the saws are actuated against the strip 32 provides that the side edges of the patches will be tapered. When these patches are applied to the piece to be repaired, the imperfection in the piece is first cut out to provide a socket substantially the shape of the patch. The patch is then inserted and wedged tightly in place. Glue is applied to hold the patch and after the glue has set, the top surface is smoothed off. This method of applying the patches causes them to be securely held in place.

Having thus described my invention, what I claim as new therein and desire to secure by Letters-Patent, is:

1. A patch cutting machine comprising means for supporting a strip from which patches are to be cut, a pair of circular cupped saws facing each other in parallel planes, means for driving the saws, and means for successively moving the saws while driven angularly into contact with a strip on said support to form intersecting arcuate cuts therein to define and sever patches from the strip.

2. A patch cutting machine comprising means for supporting a strip from which patches are to be cut, a pair of circular cupped saws spaced apart and facing each other above the strip support, means for driving the saws, and means for alternately moving the saws downwardly and inwardly against the strip to form intersecting arcuate cuts therein whereby patches are defined and severed from the strip.

3. A patch cutting machine comprising means for supporting and guiding a strip from which patches are to be cut, a pair of circular cupped saws facing in opposite directions and disposed axially in a direction transversely with respect to the strip guiding means, means for driving the saws, means for alternately moving the saws to engage the strip to form arcuate intersecting cuts therein whereby the patches are defined and severed from the strip, and means for intermittently advancing the strip in accordance with action from the saws.

4. A patch cutting machine comprising a strip supporting and guiding means, a pair of circular cupped saws faced toward each other and axially disposed in a plane transversely of the strip guiding and supporting means, a motor for driving each saw, separate means for mounting the motors, driven means for causing the motor mountings to be reciprocally actuated to thereby move the saws alternately into contact with the strip to form arcuate cuts therein for defining and removing patches from the strip.

5. A patch cutting machine comprising a strip supporting and guiding means, a pair of circular cupped saws faced toward each other and axially disposed in a plane transversely of the strip guiding and supporting means, a motor for driving each saw, separate means for mounting the motors, driven means for causing the motor mountings to be reciprocally actuated to thereby move the saws alternately into contact with the strip to form arcuate cuts therein for defining and removing patches from the strip, and a feed mechanism synchronized with the movement of the motors for intermittently advancing the strip definite amounts.

6. A patch cutting machine of the character described comprising a frame structure, a strip supporting beam mounted thereon having a guide groove for receiving a patch forming strip, a pair of guides supported in the frame, a slide mounted in each guide, motors mounted by the slides and disposed at opposite sides of the strip supporting means, and axially in a plane that is transverse with respect to the beam, a circular saw mounted by the shaft of each motor, said saws being cupped toward each other, means for reciprocally actuating the slides to alternately move the saws into contact with the strip to form intersecting arcuate cuts therein for the removal of patches from the strip.

7. A patch cutting machine of the character described comprising a frame structure, a strip supporting beam mounted thereon having a guide groove for receiving a patch forming strip, a pair of guides supported in the frame, a slide mounted in each guide, motors mounted by the slides and disposed at opposite sides of the strip supporting means, and axially in a plane that is transverse with respect to the beam, a circular saw mounted by the shaft of each motor, said saws being cupped toward each other, means for reciprocally actuating the slides to alternately move the saws into contact with the strip to form intersecting arcuate cuts therein for the removal of patches from the strip, feed rollers engaging the strip, ratchet mechanism for advancing the rollers, and means operable by a connection with the slide reciprocating means for actuating the ratchet mechanism.

8. A patch cutting machine of the character described comprising a frame structure, a strip supporting beam mounted horizontally thereon, and having a guide groove longitudinally thereof for receiving a patch forming strip, supporting shafts mounted in the frame transversely of and beneath the beam, blocks adjustably fixed on the said supporting shafts, guides pivotally mounted on the blocks, slides mounted in the guides, motors mounted by the slides and disposed at opposite sides of the strip supporting beam, a circular saw mounted by the shaft of each motor, said saws being cupped toward each other, a driven shaft having eccentrics thereon and connecting rods with ends attached to the slides and to the eccentrics whereby the slides are caused to reciprocate and whereby the motors are lowered to alternately bring the saws into contact with the strip to form arcuate intersecting cuts therein for defining and removing the patches.

9. A device as in claim 8 wherein guides are pivotally mounted on the blocks and are adjustable to advance the angular relationship of the saws to vary the formation of the patches.

10. A device as in claim 8 wherein the connecting rods are adjustable in length to vary the relationship of the saws to the strip.

11. A device as in claim 8 wherein the blocks are adjustable on the shafts to move the motors from and toward the strip supporting beam and wherein the guides are pivotally mounted on the blocks to change the angular relationship of the motor shafts wherein the connecting rods are adjustable in length to alter the relationship of the saws with respect to the strap and wherein the motors are adjustably mounted on their supports.

Signed at Tacoma, Washington, this 29th day of April, 1930.

AMES R. JAYNE.